United States Patent
Nakagawa

(10) Patent No.: US 8,176,956 B2
(45) Date of Patent: May 15, 2012

(54) PNEUMATIC RADIAL TIRE FOR MOTORCYCLE

(75) Inventor: Hidemitsu Nakagawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 595 days.

(21) Appl. No.: 12/376,402

(22) PCT Filed: Jul. 6, 2007

(86) PCT No.: PCT/JP2007/063563
§ 371 (c)(1),
(2), (4) Date: Feb. 4, 2009

(87) PCT Pub. No.: WO2008/018260
PCT Pub. Date: Feb. 14, 2008

(65) Prior Publication Data
US 2010/0163144 A1    Jul. 1, 2010

(30) Foreign Application Priority Data
Aug. 11, 2006   (JP) ................................. 2006-220009

(51) Int. Cl.
*B60C 1/00* (2006.01)
*B60C 11/00* (2006.01)
(52) U.S. Cl. ................ 152/209.5; 152/209.11; 152/905
(58) Field of Classification Search ............... 152/209.1, 152/209.5, 209.11, 905
See application file for complete search history.

(56) References Cited

U.S. PATENT DOCUMENTS

| 4,385,653 A | 5/1983 | Okazaki et al. |
| 2002/0000276 A1* | 1/2002 | Nakamura ............... 152/209.11 |
| 2003/0000616 A1 | 1/2003 | Watkins et al. |

FOREIGN PATENT DOCUMENTS

| DE | 35 25 394 A1 | 1/1986 |
| FR | 1.445.678 A | 10/1966 |

(Continued)

OTHER PUBLICATIONS

DE 3525394, Jan. 30, 1986, English language machine translation, retreived on Aug. 2, 2011 from https://register.epo.org/espacenet/regviewer.*

(Continued)

*Primary Examiner* — Eric Hug
(74) *Attorney, Agent, or Firm* — Sughrue Mion, PLLC

(57) ABSTRACT

There is provided a pneumatic radial tire for a motorcycle, which reduces a difference between rigidities of the center section and the shoulder sections of a tread section to simultaneously provide a long wear life, high grip force, and high-speed durability without impairing linear characteristics of handling. It is a pneumatic radial tire for a motorcycle having a carcass 1 and a belt layer 2. A tread section is formed of a center section rubber 3, disposed in a widthwise center region of the tire and on both sides of a tire equator, and both side rubber 4, disposed on both widthwise ends of the tire. In addition, the tread section has a structure in which the center section rubber 3 and the both side rubber 4 are successively laminated upon each other at both widthwise ends of the tire. Further, the ratio of the thickness of both side rubber 4 in the tread section increases towards both widthwise ends of the tire, and a modulus of the both side rubber 4 is less than a modulus of the center section rubber 3.

4 Claims, 1 Drawing Sheet

FOREIGN PATENT DOCUMENTS

| | | |
|---|---|---|
| JP | 56-099805 A | 8/1981 |
| JP | 57-182502 | 11/1982 |
| JP | 60-094804 A | 5/1985 |
| JP | 61-027707 A | 2/1986 |
| JP | 01-127401 A | 5/1989 |
| JP | 11-189010 A | 7/1999 |
| JP | 2000-158910 A | 6/2000 |
| JP | 2003-515487 A | 5/2003 |
| JP | 2005-271760 A | 10/2005 |
| JP | 2007-223569 A | 9/2007 |
| WO | 2007/052701 A1 | 5/2007 |

OTHER PUBLICATIONS

Supplementary European Search Report cited in European Application No. 07768295.3-2425/2050587 dated Aug. 3, 2010 (6 pages).

* cited by examiner (a)

(b)

PNEUMATIC RADIAL TIRE FOR MOTORCYCLE

TECHNICAL FIELD

The present invention relates to a pneumatic radial tire for a motorcycle (hereunder simply referred to as "tire"), and, more particularly, to a pneumatic radial tire for a motorcycle related to an improvement of a tread section.

BACKGROUND ART

Hitherto, for simultaneously providing a long wear life and a high grip force, as shown in FIG. 2, what is called a SACT structure has been used for a tread section of a pneumatic radial tire for a motorcycle. In the SACT structure, a compound 21 having good wear resistance, having excellent durability, and having high rigidity is provided at a crown center section, and a soft compound 22 providing a high grip force is provided at a shoulder section. Higher speed of a vehicle in recent years has caused a demand for a tire having a high level high-speed durability. As a reinforcement layer, a mono-spiral belt having a reinforcement cord wound in a peripheral direction and having excellent high-speed durability is being used.

Regarding a tire in which a plurality of rubber types are used for tread rubber, for example, Patent Document 1 discloses a tire for a motorcycle. In the tire, a low-tan-δ tread rubber is disposed continuously from a tread center section through a carcass side of a shoulder section or discontinuously therefrom except for the shoulder section; and a high-tan-δ tread rubber is disposed at the shoulder section. Patent Document 2 discloses a pneumatic tire for a motorcycle. In the tire, a tread section, formed of two types of rubber, that is, hard rubber and soft rubber, is divided into three sections, that is, a center section and both shoulder sections; and the center section is formed of a single layer of hard rubber. In addition, each shoulder section has a cap-and-base structure in which the hard rubber forms a lower layer and the soft rubber forms an upper layer. Further, the thickness of the soft rubber at the center section is greater than the thickness at a side of an end of the tread section. Patent Document 3 discloses a tire for a motorcycle. In the tire, an inner layer, formed of bridged rubber having a high hardness, and an outer layer, formed of bridged rubber having a low hardness, are laminated upon each other at a shoulder section. In addition, a crown section is formed of bridged rubber having a high hardness.

Patent Document 1: Japanese Unexamined Patent Application Publication No. 60-94804 (claims, etc.)
Patent Document 2: Japanese Unexamined Patent Application Publication No. 11-189010 (claims, etc.)
Patent Document 3: Japanese Unexamined Patent Application Publication No. 2005-271760 (claims, etc.)

DISCLOSURE OF INVENTION

Problem to be Solved by the Invention

As mentioned above, in a pneumatic radial tire for a motorcycle, for simultaneously providing a long wear life, a high grip force, and high-speed durability, for example, a SACT structure is used in a tread section, or a peripheral-direction belt is used. However, in the related SACT structure shown in FIG. 2, since a difference between rigidities of the two types of compounds used in the center section and the shoulder section is large, in a motorcycle, changes in rigidities at the divided sections become large as an area to be grounded shifts from the center section to the shoulder section in accordance with a change in a camber angle (CA) during turning. This gives rise to the problem that linear characteristics of handling are reduced.

Accordingly, an object of the present invention is to provide a pneumatic radial tire for a motorcycle, which reduces a difference between rigidities of a center section and a shoulder section of a tread section to simultaneously achieve a long wear life, a high grip force, and high-speed durability without impairing linear characteristics of handling.

Means for Solving the Problem

As a result of keen examination, the present inventor have completed the present invention by finding out that the aforementioned problem can be overcome when the following is achieved. That is, for simultaneously providing a long wear life and a high grip ability, rubber having a high elastic modulus and having excellent wear resistance is disposed at a center section, and rubber having a low elastic modulus and providing a high grip force is disposed at a shoulder section that is grounded during turning. In addition, for overcoming the problem that the rigidities change, the relationship between the elastic moduli and the arrangement of the two types of rubber is predeterminately defined.

According to the present invention, there is provided a pneumatic radial tire for a motorcycle, the tire having a pair of bead sections, a pair of side wall sections, provided consecutively with the bead sections, and a tread section, provided consecutively in a toroid form between both of the side wall sections, the tire further having at least one layer of carcass and a belt layer, the at least one layer of carcass reinforcing each section between the bead sections, the belt layer being disposed at a tire radial outer side of the carcass and having a reinforcement cord spirally wound in a peripheral direction. In the pneumatic radial tire, the tread section is formed of a center section rubber and both side rubber, the center section rubber being disposed in a widthwise center region of the tire and on both sides of a tire equator, the both side rubber being disposed on both widthwise ends of the tire; wherein the tread section has a structure in which the center section rubber and the both side rubber are successively laminated upon each other at the both widthwise ends of the tire; wherein a ratio of a thickness of the both side rubber in the tread section increases towards the both widthwise ends of the tire; and wherein a modulus of the both side rubber is lower than a modulus of the center section rubber.

In the present invention, it is desirable that a ratio of a 300% modulus Mc of the center section rubber and a 300% modulus Me of the both side rubber satisfy a relationship expressed by the following formula:

$$1 < Mc/Me \leq 1.5$$

More specifically, it is desirable that the 300% modulus Mc of the center section rubber be greater than or equal to 11 MPa and less than or equal to 17 MPa, and the 300% modulus Me of the both side rubber be greater than or equal to 8 MPa and less than or equal to 14 MPa. In addition, it is desirable that a terminal end in a tire widthwise outer side of the both side rubber exist in a side wall region. Further, it is desirable that the reinforcement cord of the belt layer be a steel cord.

ADVANTAGES OF THE INVENTION

According to the present invention, by virtue of the above-described structure, it is possible to provide a pneumatic radial tire for a motorcycle in which a difference between the rigidities of the center section and the shoulder sections of the tread section is reduced to further increase wear life, a grip force, and high-speed durability without impairing linear characteristics of handling, so that safety during traveling can be ensured.

Figure 1:
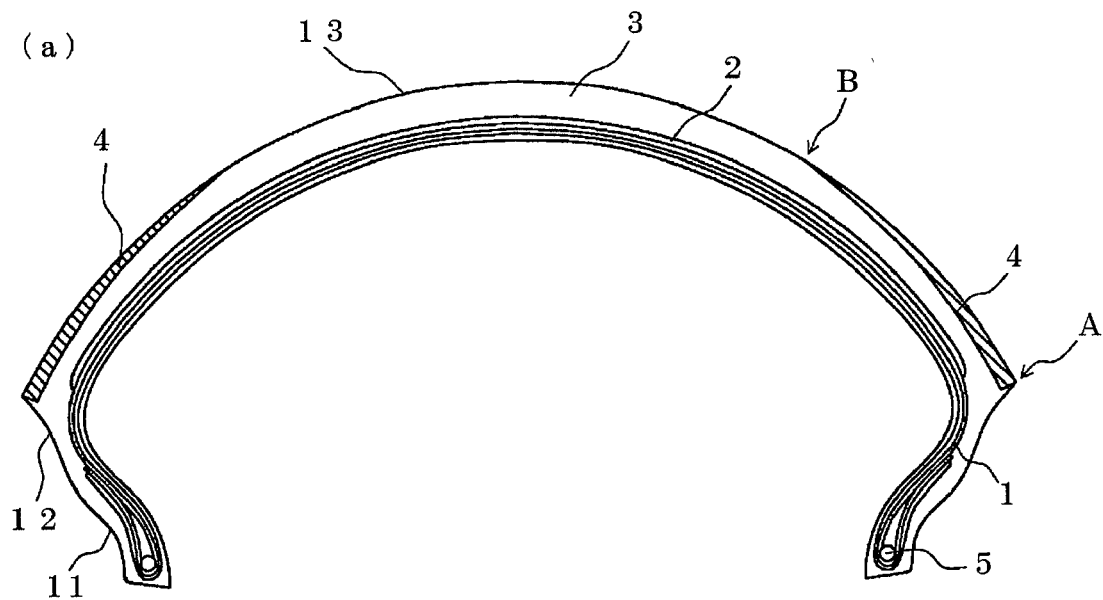
FIG. 1 is a sectional view of a pneumatic radial tire for a motorcycle according to an embodiment of the present invention in a widthwise direction of the tire.

REFERENCE NUMERALS 1 carcass
2 belt layer
3 center section rubber
4 both side rubber
5 bead core
11 bead section
12 side wall section
13 tread section

BEST MODE FOR CARRYING OUT THE INVENTION

A preferred embodiment of the present invention will hereunder be described in detail.

FIG. 1(a) is a sectional view of a pneumatic radial tire for a motorcycle according to a preferred embodiment of the present invention. As shown in the figure, the tire according to the present invention has a pair of bead sections 11, a pair of side wall sections 12, provided consecutively therewith, and a tread section 13, provided consecutively in a toroid form between both side wall sections. The tire also has at least one layer, two layers in the figure, of carcass 1, and a belt layer 2. The carcass 1 is used for reinforcing each section between the bead sections. The belt layer 2 is disposed at a radial-direction outer side of the tire and has a reinforcement cord spirally wound in a peripheral direction.

Figure 2:
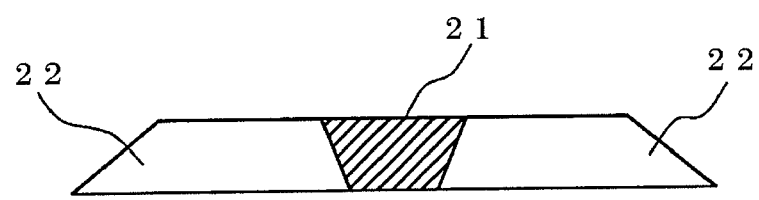
FIG. 2 is a schematic sectional view of a tread structure of a related pneumatic radial tire for a motorcycle.

In the present invention, as shown in the figure, the tread section 13 is formed of two types of tread rubber, that is, a center section rubber 3, disposed in a widthwise center region of the tire and on both sides of a tire equator, and both side rubber 4, disposed on both widthwise ends of the tire. In addition, the tread section 13 has a structure in which the center section rubber 3 and the both side rubber 4 are successively laminated upon each other at both widthwise sides of the tire (shoulder sections). Further, the ratio of the thickness of both side rubber 4 in the tread section increases towards both widthwise ends of the tire. FIG. 2(b) is a schematic sectional view in which only the tread section is shown. The both side rubber 4 is formed of a compound having a lower modulus than the center section rubber 3.

That is, for providing a tire having a long wear life, durability, and grip ability, the center section rubber 3 having a high elastic modulus and having excellent wear resistance is disposed at a center section, and the both side rubber 4 having a low elastic modulus and providing a high grip force is disposed at the shoulder sections that are grounded during turning. However, for reducing changes in rigidities of the center section and the shoulder sections, the high grip rubber (both side rubber 4) of the shoulder sections is provided only at a cap, that is, a surface-layer side of the tire, and a gauge thereof is set so that it gradually increases from the center section to the shoulder sections. This ensures good linear characteristics of handling.

In the present invention, it is desirable that the ratio of a 300% modulus Mc of the center section rubber 3 and a 300% modulus Me of the both side rubber 4 satisfy the relationship expressed by the following formula:

$$1 < Mc/Me \leq 1.5$$

When the ratio Mc/Me exceeds 1.5, the difference between the rigidity of the center section and that of the shoulder sections becomes too large. This may impair the linear characteristics of handling.

Further, in the present invention, it is desirable that the 300% modulus Mc of the center section rubber 3 be greater than or equal to 11 MPa and less than or equal to 17 MPa, and that the 300% modulus Me of the both side rubber 4 be greater than or equal to 8 MPa and less than or equal to 14 MPa. When the 300% modulus of the center section rubber 3 is less than 11 MPa, wear resistance is reduced; and when it is greater than 17 MPa, the absorptive property may be impaired. When the 300% modulus of the both side rubber 4 is less than 8 MPa, wear skin of the shoulder sections is considerably deteriorated, thereby reducing grip force; and when it is greater than 14 MPa, grip force may not be ensured.

It is desirable that, regarding a more specific location of the both side rubber 4, a terminal end A in a widthwise outer side of the tire be disposed so as to exist in a side wall region. When the outer-side terminal end A of the both side rubber 4 enters a crown surface, the center section rubber 3 having a high rigidity and providing a relatively low grip force enters a region to be grounded during turning. Therefore, the grip ability may be reduced.

Further, from the viewpoint of ensuring a long wear life, it is desirable that the both side rubber 4 be disposed so that a terminal end B in a widthwise inner side of the tire is not included in a region where the tire is grounded during linear travel of the vehicle, that is, so that it is positioned outside this area. Although, as long as the thickness of the both side rubber 4 is increased towards both widthwise ends of the tire, its increase rate is not particularly limited, the rubber thickness is desirably increased at a certain rate in the widthwise direction.

In the present invention, the only important point is that the tread section 13 have the center section rubber 3 and the both side rubber 4, so that, for example, the other details and materials of the tire structure are not particularly limited.

For example, the belt layer 2 is what is called a spiral belt formed by spirally winding a long rubber coated cord (not shown), in which one cord is coated with rubber, or a strip-like ply (not shown), in which a plurality of cords are coated with rubber. In addition, in the spiral belt, a cord direction substantially corresponds to a tire peripheral direction. In addition to being a steel cord, the reinforcement cord may be a cord formed of a material appropriately selected from the following, that is, organic fiber, glass fiber, carbon fiber, etc. Examples of organic fiber are aromatic polyamide (aramid; for example, Kevlar (trade name; product of E.I. du Pont de Nemours and Company)), polyethylene naphthalate (PEN), polyethylene terephthalate (PET), rayon, xyron (trademark) (polyparaphenylene benzobisoxazole (PBO) fiber), and aliphatic polyamide (nylon). However, for maintaining the wear life and the high-speed durability at high levels, it is desirable to use, as the reinforcement cord, a steel cord that is highly rigid and that can stabilize movement of the tread surface.

For example, as shown in the figure, each of bead cores 5 is embedded in the pair of bead sections 11 of the tire according to the present invention, and the carcass 1 is folded around the bead cores 5 from the inner side to the outer side of the tire, and are stopped. Further, a tread pattern is formed as appropriate on a surface of the tread section 13, and an inner liner (not shown) is formed at an innermost layer.

The tire according to the present invention is applicable to either a front tire or a rear tire of the motorcycle. Preferably, it is used as a rear tire.

Examples

The present invention will hereunder be described in more detail using an example.

Pneumatic radial tires for a motorcycle having the cross-sectional structure shown in FIG. 1 were produced with a tire size of MCR180/55ZR17M/C by changing the 300% modulus Mc of the center section rubber 3 and the 300% modulus Me of the both side rubber 4, and by changing the ratio Mc/Me, as shown in table 1 below. Each carcass 1 had two layers, and PET was used for each reinforcement cord. A mono-spiral belt in which a steel cord coated with rubber was spirally wound was used for each belt layer 2.

<Evaluation Condition>

The obtained sample tires were mounted to a rim having a rim size of MT5.5×17 to mount them for rear tires of a 1000 cc bike, and an internal pressure of 250 kPa was applied. Commercially available tires having a tire size of MCR120/70ZR17M/C were used as front tires. Each sample tire was tested by a professional rider who actually drove a vehicle in a test course, so that absorptive property, handling ability, grip ability during turning, and wear life were evaluated by the professional rider on the basis of how the professional rider sensed them. For the grip ability during turning, how easily the tires slid when they were turning at a high speed was evaluated, so that if, up to a high speed, they rarely slid, the grip ability was evaluated as being good. For the handling ability, whether a change in the behavior of each tire in accordance with a camber angle (CA) from linear movement to turning was linear was evaluated. If the behavior changed along the way or with a deep CA, the handling ability was evaluated as being poor. The evaluation results are shown using indices in Table 1 below. For the evaluation results, the larger the numerical values, the better the ability.

TABLE 1

|  | Mc/Me | Mc (MPa) | Me (MPa) | Wear Life (Index) | Grip Ability During Turning (Index) | Handling Ability (Index) | Absorptive Property (Index) | Both-Side-Rubber Boundary Position |
|---|---|---|---|---|---|---|---|---|
| Example 1 | 1.3 | 14 | 11 | 120 | 120 | 120 | 105 | Outside Grounded Area |
| Example 2 | 1.1 | 14 | 13 | 120 | 105 | 110 | 105 | Outside Grounded Area |
| Example 3 | 1.3 | 12 | 9 | 110 | 125 | 120 | 110 | Outside Grounded Area |
| Comparative Example 1 | 0.8 | 11 | 14 | 90 | 90 | 85 | 110 | Outside Grounded Area |
| Example 4 | 1.3 | 14 | 11 | 90 | 125 | 110 | 110 | Inside Grounded Area |

As shown in Table 1 above, it was confirmed that the wear life, the grip ability, the handling ability, and the absorptive property of the tires according to the examples using two types of rubber, including center section rubber and both side rubber, in a predetermined arrangement were well balanced and of a high level.

The invention claimed is:

1. A pneumatic radial tire for a motorcycle, the tire having a pair of bead sections, a pair of side wall sections, provided consecutively with the bead sections, and a tread section, provided consecutively in a toroid form between both of the side wall sections, the tire further having at least one layer of carcass and a belt layer, the at least one layer of carcass reinforcing each section between the bead sections, the belt layer being disposed at a tire radial outer side of the carcass and having a reinforcement cord spirally wound in a peripheral direction, wherein the tread section is formed of a center section rubber and both side rubber, the center section rubber being disposed in a widthwise center region of the tire and on both sides of a tire equator, the both side rubber being disposed on both widthwise ends of the tire; wherein the tread section has a structure in which the center section rubber and the both side rubber are successively laminated upon each other at the both widthwise ends of the tire; wherein a ratio of a thickness of the both side rubber in the tread section increases towards the both widthwise ends of the tire; and wherein a modulus of the both side rubber is lower than a modulus of the center section rubber, wherein a 300% modulus Mc of the center section rubber is greater than or equal to 11 MPa and less than or equal to 17 MPa, and a 300% modulus Me of the both side rubber is greater than or equal to 8 MPa and less than or equal to 14 MPa.

2. The pneumatic radial tire for a motorcycle according to claim 1, wherein a ratio of a 300% modulus Mc of the center section rubber and a 300% modulus Me of the both side rubber satisfies a relationship expressed by the following formula:

$$1 < Mc/Me \leq 1.5$$

3. The pneumatic radial tire for a motorcycle according to claim 1, wherein a terminal end in a tire widthwise outer side of the both side rubber exists in a side wall region.

4. The pneumatic radial tire for a motorcycle according to claim 1, wherein the reinforcement cord of the belt layer is a steel cord.

* * * * *